(12) United States Patent
Caldwell (10) Patent No.: US 7,555,863 B1
(45) Date of Patent: Jul. 7, 2009

(54) LANDSCAPE EDGING

(75) Inventor: E. Neal Caldwell, Knoxville, TN (US)

(73) Assignee: Dalen Products, Inc., Knoxville, TN (US)

( * ) Notice: Subject to any disclaimer, the term of this patent is extended or adjusted under 35 U.S.C. 154(b) by 0 days.

(21) Appl. No.: 12/103,302

(22) Filed: Apr. 15, 2008

(51) Int. Cl.
    *A01G 1/00* (2006.01)
(52) U.S. Cl. .................................................. 47/33
(58) Field of Classification Search ............... 47/33; D25/121, 164
    See application file for complete search history.

(56) References Cited

U.S. PATENT DOCUMENTS

| | | | | |
|---|---|---|---|---|
| 1,727,779 A | * | 9/1929 | Marengo | 256/1 |
| 1,843,108 A | * | 2/1932 | Clayden | 47/33 |
| 2,146,784 A | * | 2/1939 | Wilson | 47/33 |
| 2,821,809 A | * | 2/1958 | Collien et al. | 47/33 |
| 3,357,143 A | | 12/1967 | Bayes et al. | |
| 3,387,786 A | * | 6/1968 | Rynberk | 239/201 |
| 3,841,022 A | * | 10/1974 | Thodos | 47/33 |
| 4,644,685 A | * | 2/1987 | Tisbo et al. | 47/33 |
| 4,761,923 A | | 8/1988 | Reum et al. | |
| D329,296 S | * | 9/1992 | Albrecht | D25/156 |
| 5,301,461 A | | 4/1994 | Zwier | |
| 5,826,372 A | | 10/1998 | Parsons | |
| 6,779,297 B2 | | 8/2004 | Conde | |
| 2006/0150480 A1 | | 7/2006 | Ruller | |

\* cited by examiner

*Primary Examiner*—Francis T Palo
(74) *Attorney, Agent, or Firm*—Luedeka, Neely & Graham, PC (57) ABSTRACT

Mating first and second landscape edging segments having improved end-to-end connection are provided which include an open-ended slot defined either adjacent an open end of the first edging segment or adjacent a received end of the second edging segment, the open-ended slot being configured for receiving a portion of one of the first or second edging segments so that the first and second edging segments may be mated by the open end of the first edging segment receiving the received end of the second edging segment, with the first and second edging segments partially overlapping.

6 Claims, 14 Drawing Sheets

LANDSCAPE EDGING

FIELD

This disclosure relates to the field of landscape edging. More particularly, the disclosure relates to mating landscape edging segments having improved end-to-end connection.

BACKGROUND

Landscape edging typically comes in one-piece sections that are unrolled and cut to fit the installation area, or in segments that are placed end-to-end. Edging segment construction is advantageous in that the segments typically have improved rigidity as compared to one-piece rolled edgings. However, one short-coming of edging segments involves their interconnection structure. Typical segment connections often fail, leaving gaps or other visual and structural discontinuities in the edging.

The disclosure relates to mating landscape edging segments having improved end-to-end connection. The resulting edging structure has improved strength and aesthetics as compared to conventional edging.

SUMMARY

The above and other needs are met by a landscape system having mating landscape edging segments with improved end-to-end connection.

In one embodiment, the system includes a first edging segment having a first conduit portion defining an open end configured to provide a receiver, and a first substantially planar portion extending from the first conduit portion and substantially longitudinally aligned with the first conduit portion. The first planar portion is configured for being anchored within the ground and for positioning the first conduit portion relative to the ground.

The system also includes a second edging segment configured for mating with the first edging segment and having a second conduit portion having a received end configured for being received by the receiver of the first conduit portion of the first edging segment. The second segment has a second substantially planar portion extending from the second conduit portion and substantially longitudinally aligned with the second conduit portion. The second planar portion is configured for being anchored within the ground and for positioning the second conduit portion relative to the ground.

An open-ended slot is defined either adjacent the open end of the first edging segment or adjacent the received end of the second edging segment The open-ended slot is configured for receiving a portion of one of the first or second edging segments so that the first and second edging segments may be mated by the open end of the first edging segment receiving the received end of the second edging segment, with the first and second edging segments partially overlapping.

Figure 8:
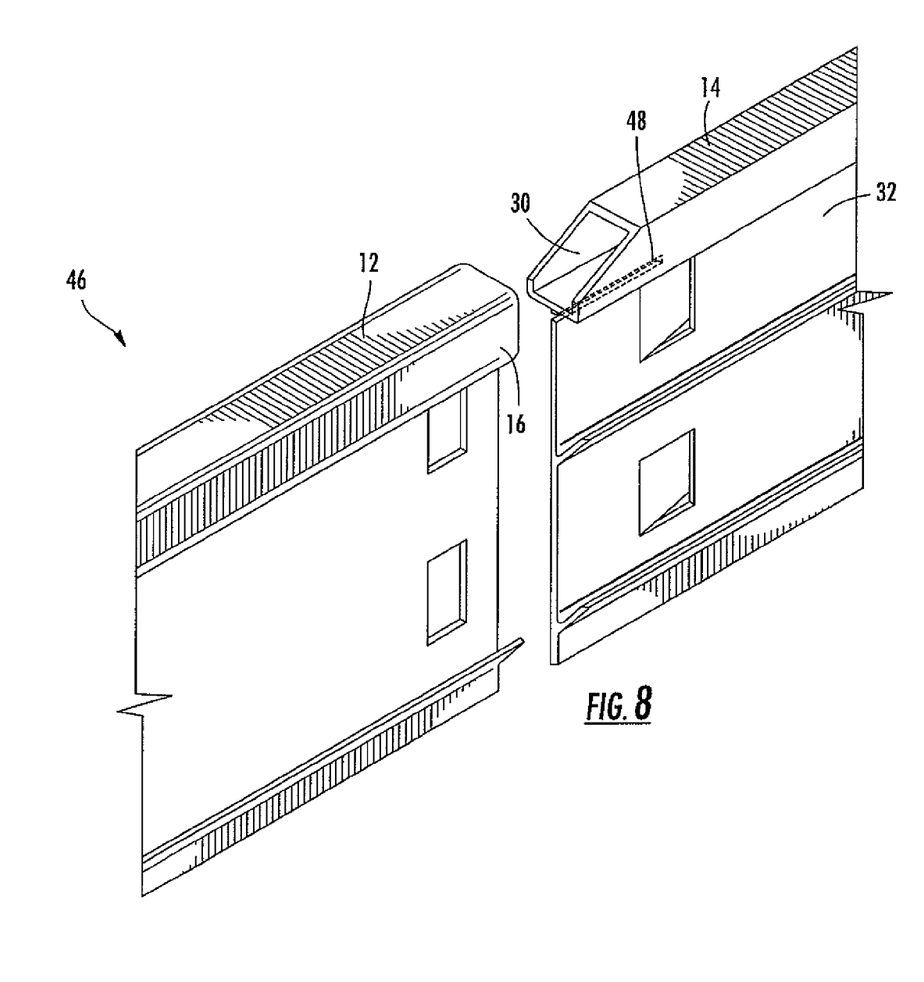
FIG. 8 is a close-up frontal view of the first and second mating landscaping edging segments in an unmated configuration.
Figure 13:
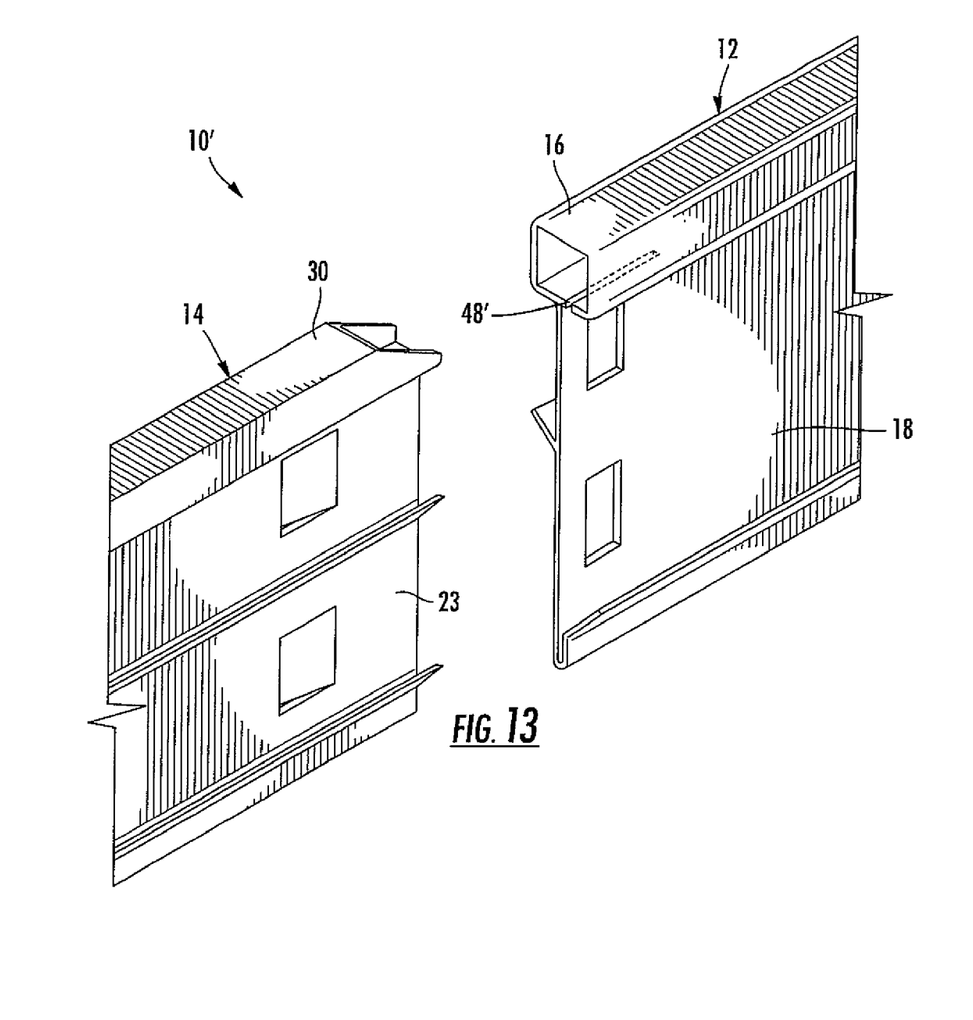
FIG. 13 is a close-up view of an alternate embodiment of the first and second mating landscaping edging segments in an unmated configuration.

FIG. 8 provides an example of the open-ended slot being located adjacent the received end of the second edging segment. FIG. 13 shows an example of the open-ended slot located adjacent the open end of the first edging segment.

The landscaping system advantageously provides improved end-to-end connections. The provision of the mutually engaging conduits, with an open end receiving a received end of the adjoining segment, along with overlapping planar portions, provides improved strength of the assembled structure. Further, the overlapped relationship avoids the occurrence of gaps common to conventional landscaping, offering improved aesthetics.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

With initial reference to FIGS. 1-10, the disclosure relates to a landscape system 10 having mating first and second landscape edging segments 12 and 14 having improved end-to-end connection.

Figure 1:
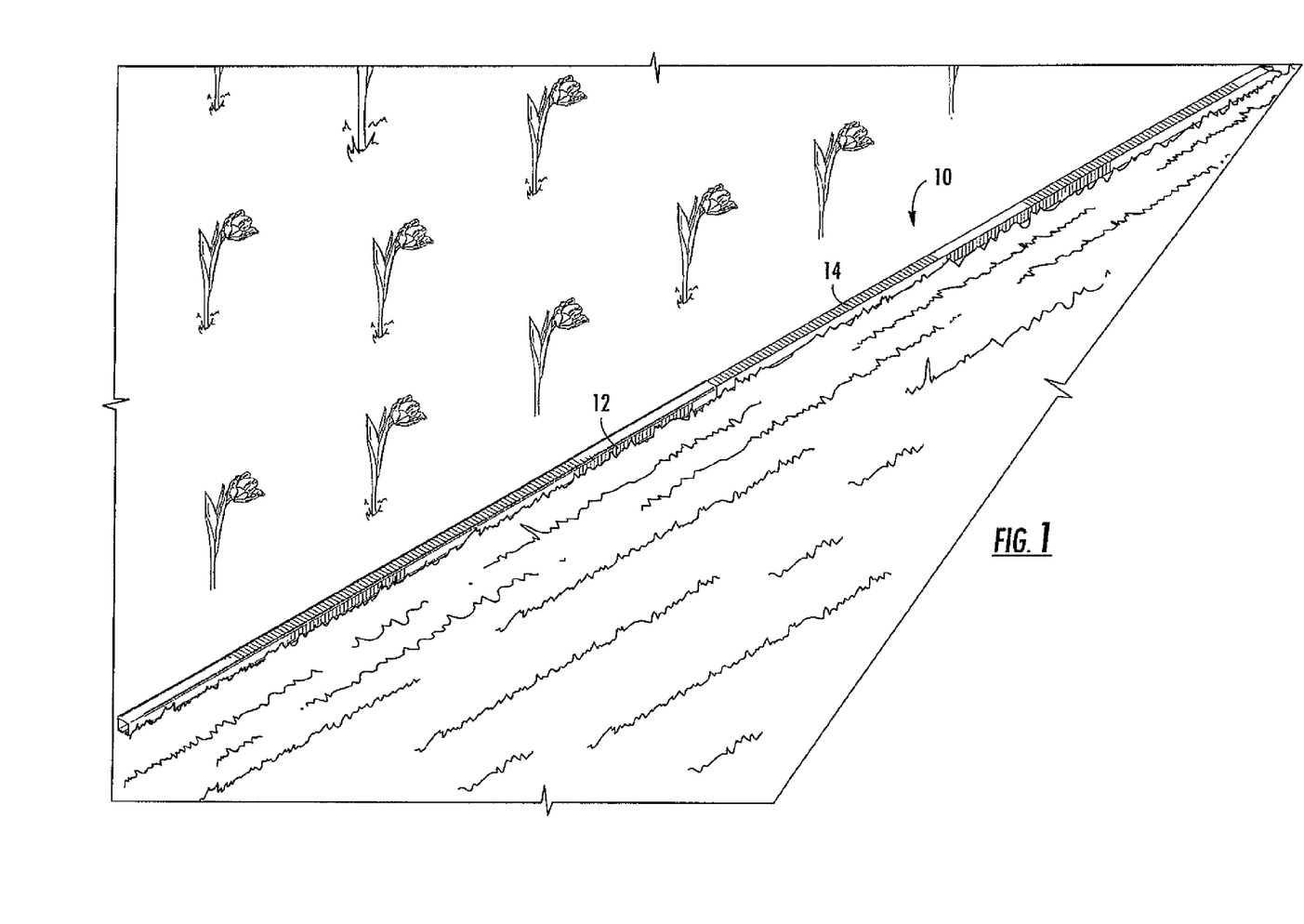
FIG. 1 is a perspective view showing an installed landscape system.
Figure 2:
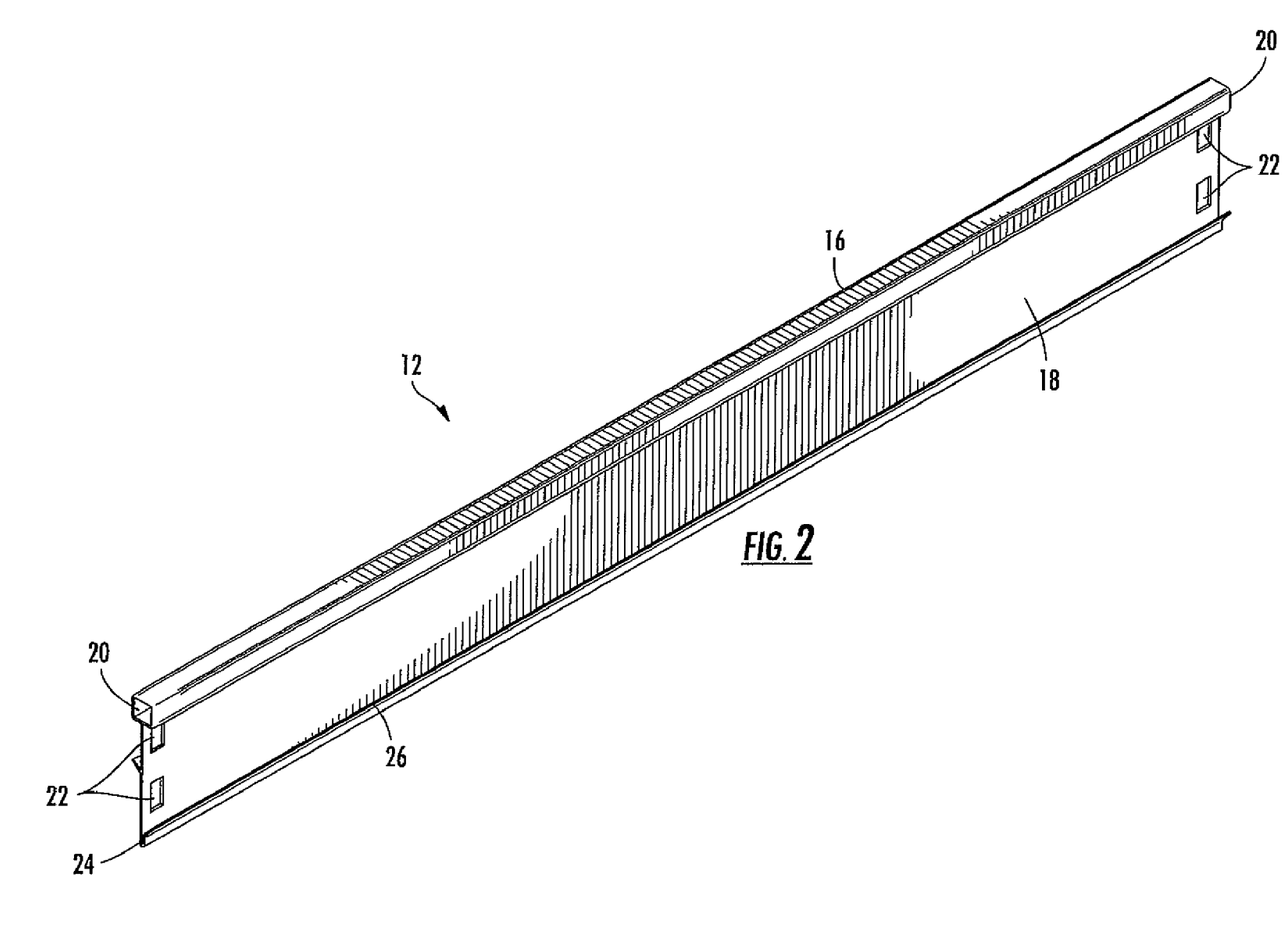
FIG. 2 is a perspective view of a first mating landscaping edging segment.
Figure 5:
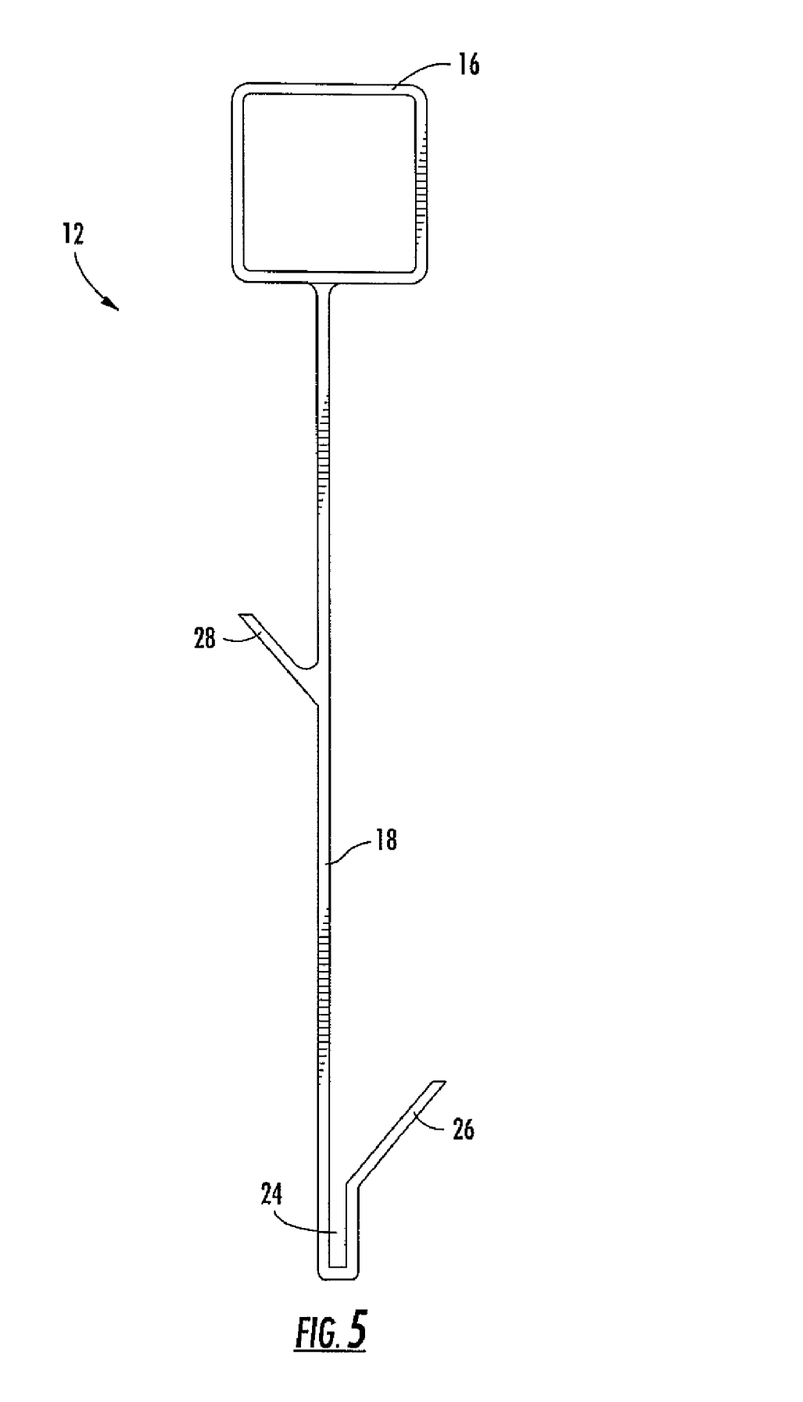
FIG. 5 is a cross-sectional end view of the first mating landscaping edging segment.

With reference to FIGS. 2 and 5, the landscape edging segment 12 may be of one-piece molded plastic construction and includes an upper conduit portion 16 and a lower substantially planar portion 18. The segment 12 may be constructed to be flexible so as to extend along curved landscape environments, or may be constructed to be substantially rigid as may be desired for substantially linear landscape environments. The flexible segments are particularly desirable for compact storage, such as for shipping and store display.

The conduit portion 16 is configured to serve as an upper portion of the landscape system and the conduit portion 16 may be open or hollow throughout, or may be fully or partially filled intermediate the ends. However, the opposite open ends of the conduit portion are open to define receivers 20 for receiving portions of the segment 14 as described below. The conduit portion 16 may be of various configurations, e.g., rectangular cross-section, square cross-section, triangular cross-section, circular cross-section, and the like.

The lower substantially planar portion 18 is configured to be installed within the ground for anchoring the landscape system 10 and to position the upper conduit portion 16 as may be desired relative to the ground. In some installations it may be desired to have the conduit portion 16 spaced several inches above the ground, while in other installations it may be desired to locate the conduit portion 16 touching or just slightly above the ground.

The planar portion 18 extends substantially the entire length of the conduit portion 16 and is preferably located such that an upper edge of the planar portion 18 extends downwardly from the longitudinal lower midline of the conduit portion 16. One or more receiver apertures 22 are located adjacent each end of the planar portion for mating with corresponding portions of the segment 14 as described below.

With additional reference to FIG. 5, an elongate trough 24 is defined adjacent the lower edge of the planar portion for receiving a corresponding portion of the segment 14 as described below. The trough 24 preferably extends along the length of the planar portion 18. Elongate barb 26 projects angularly and upwardly away from and along the length of the trough 24 for facilitating anchoring of the planar portion 18 within the ground. An additional barb 28 projects angularly and upwardly away from and along the length of planar portion 18 on the opposite side and spaced above the trough 24 for facilitating anchoring in deeper installations when the ground level is above the barb 28.

Figure 3:
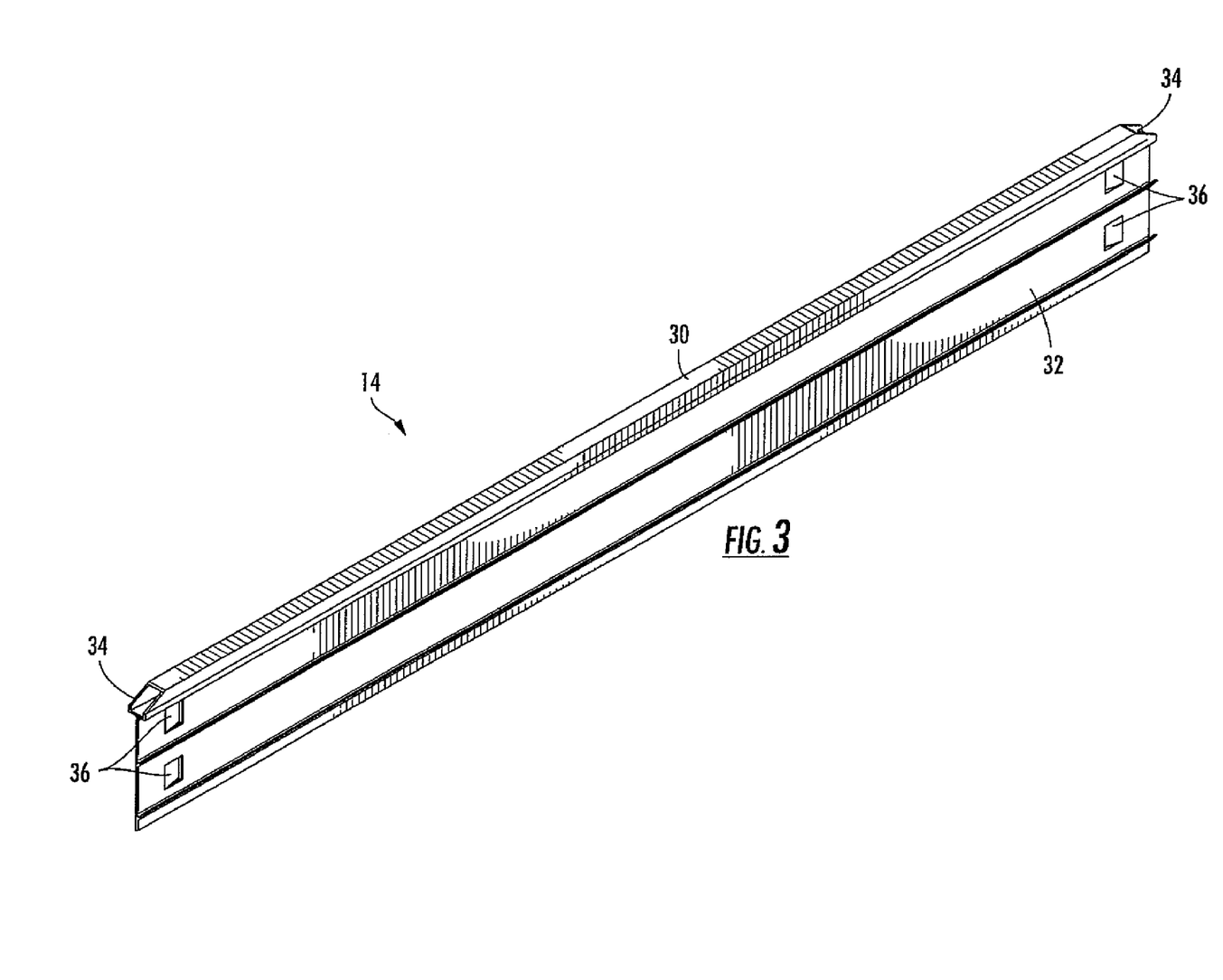
FIG. 3 is a perspective view of a second mating landscaping edging segment.
Figure 4:
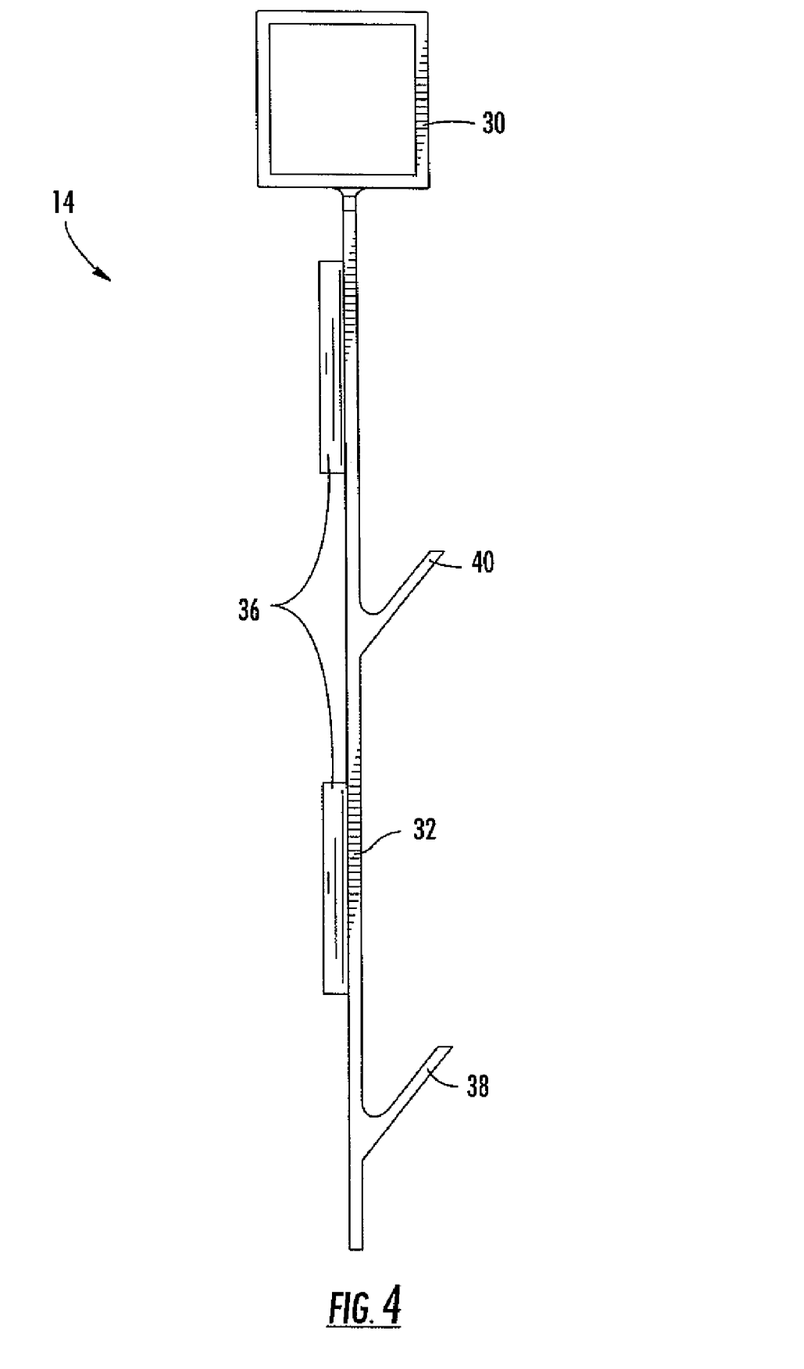
FIG. 4 is a cross-sectional end view of the second mating landscaping edging segment.

With reference to FIGS. 3 and 4, the landscape edging segment 14, similar to segment 12, may be of one-piece molded plastic construction and includes an upper conduit portion 30 and a lower substantially planar portion 32. Segment 14 may be constructed to be flexible so as to extend along curved landscape environments, or may be constructed to be substantially rigid as may be desired for substantially linear landscape environments.

The conduit portion 30, similar to the conduit portion 16, is configured to serve as an upper portion of the landscape system and the conduit portion 30 may be open or hollow throughout, or may be fully or partially filled intermediate the ends 34. However, the ends 34 do not need to be open as the ends of the conduit portion 16 which provide the receivers 20. The opposite ends 34 of the conduit portion 30 are shaped to assist in mating with the conduit portion 16 of the segment 12 as discussed further below. In some embodiments, the ends 34 are shaped such that the conduit portion 30 proximate to the ends 34 is slanted from the upper longitudinal surface downward toward the ends 34. Such a slanted configuration assists mating of the segments 12 and 14 as the ends 34 fit into the receivers 20 of the conduit portion 16 more easily. The conduit portion 30 may be of various configurations, e.g., rectangular cross-section, circular cross-section, and the like, it being understood that the conduit portion 30 is configured for mating with the conduit portion 16.

Similar to planar portion 18 of segment 12, the lower substantially planar portion 32 is configured to be installed in the ground for anchoring the landscape system 10 and to position the upper conduit portion 30 as may be desired relative to the ground. As discussed above, various spacings between the conduit portion 30 and the ground may be desired in different installations.

Planar portion 32 extends substantially the entire length of the conduit portion 30 and is preferably located such that an upper edge of the planar portion 32 extends downwardly from the longitudinal lower midline of the conduit portion 30. One or more latches 36 are located adjacent each end of the planar portion 32 for mating with corresponding receiver apertures 22 of segment 12, as further described below. The latch 36 is formed during the molding process as a projection that is configured to mate with the receiver 22. To permit the segments 12 and 14 to be mated in an overlapping configuration, the planar portion 32 includes an open-ended slot 48, as discussed in more detail below.

With additional reference to FIG. 4, an elongate barb 38 projects angularly and upwardly away from and along the length of the planar portion 32 and is spaced adjacent the lower edge of the planar portion 32 for being received by the corresponding trough 24 of segment 12 described above. Elongate barb 40 projects angularly and upwardly away from and along the length of the planar portion 32 on the same side as the barb 38 and is spaced above the elongate barb 38 for facilitating anchoring in deeper installations when the ground level is above the barb 38. When segments 12 and 14 are mated, notably, the barb 40 is located on the opposite side of the landscaping system 10 from the barb 28 as further discussed with reference to FIG. 7 below.

Figure 6:
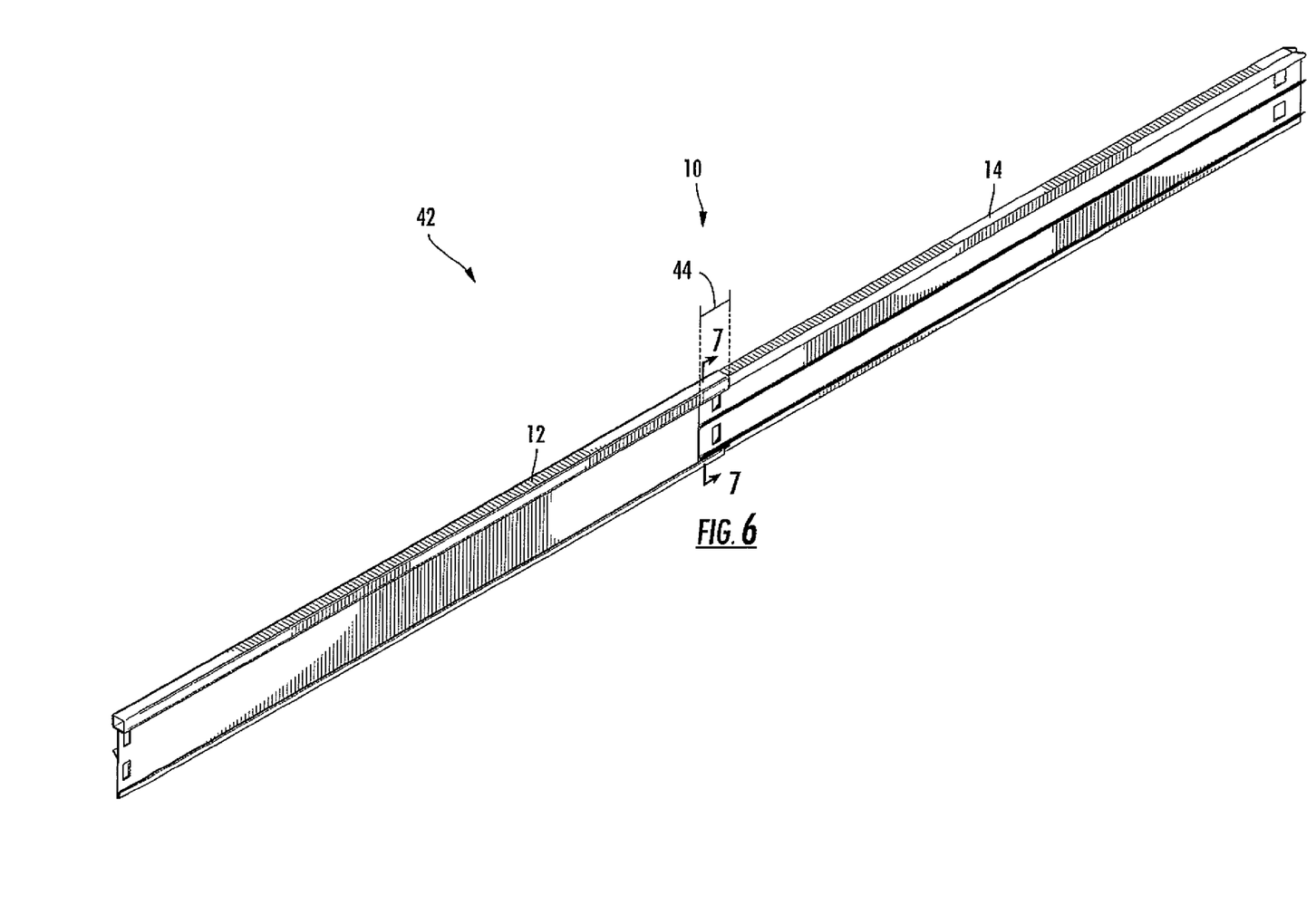
FIG. 6 is a perspective view of the first and second mating landscaping edging segments in a mated configuration.
Figure 7:
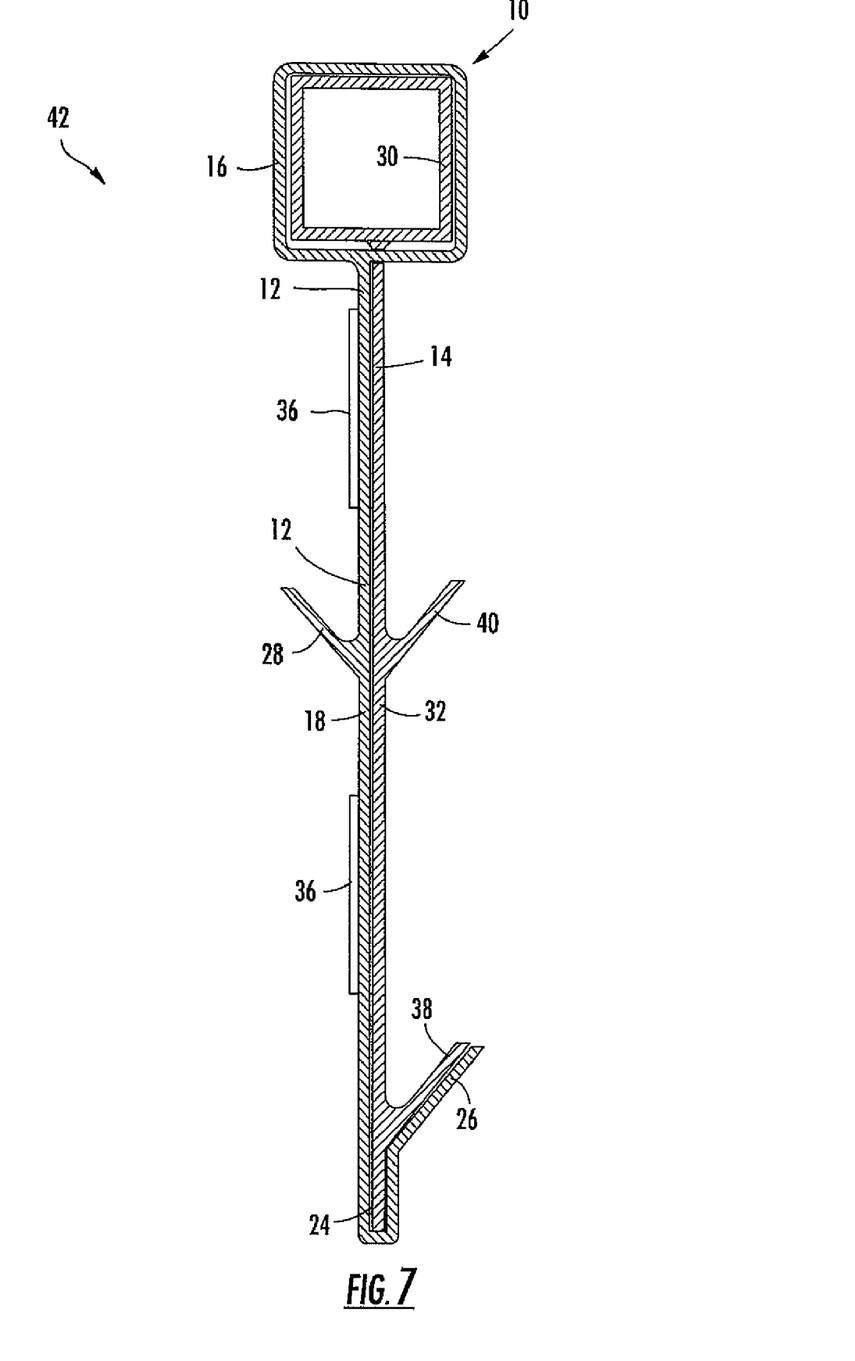
FIG. 7 is a cross-sectional end view of the first and second mating landscaping edging segments in a mated configuration and taken along line 7-7 (FIG. 6).

FIG. 6 shows the segments 12 and 14 of the landscape system in a mated configuration 42. FIG. 7 is a cross-sectional end view taken along line 7-7 (FIG. 6) of the segments 12 and 14 in the mated configuration 42. The segments 12 and 14 are molded such that, when in the mated configuration, they overlap so as to avoid a gap between the segments 12 and 14. In this regard, it will be appreciated that the mating relationship of the barbs 26 and 38 further enhances the strength of the mated structure.

In this regard, and with reference to FIG. 8, which is a close-up frontal view of the segments 12 and 14 in an unmated configuration 46, the slot 48 is formed into the planar portion 32 of the segment 14 proximate to the bottom surface of the upper conduit portion 30. The slot 48 is open-ended and receives the bottom side of the upper conduit portion 16 when the segments 12 and 14 are in the mated configuration 42 (FIGS. 6-7), thus permitting an overlapped orientation.

In addition, as discussed above, the trough 24 of the segment 12 closely receives the segment 14, and the elongate barb 26 of the segment 14 closely receives the elongate barb 38 of the segment 12. The planar portions 18 and 32 are substantially parallel and disposed alongside one-another in the mated configuration 42. The upper conduit portion 16 of the segment 12 surrounds the upper conduit portion 30 of the segment 14 in FIG. 7; however, it should be noted that only in an overlapping section 44, shown in FIG. 6, does the upper conduit portion 16 surround the upper conduit portion 30. Referring back to FIG. 7, the barbs 28 and 40 of the segments 12 and 14, respectively, are disposed on opposite sides of the landscaping system 10 in the mated configuration 42, which facilitates easy mating of the segments 12 and 14.

Figure 9A:
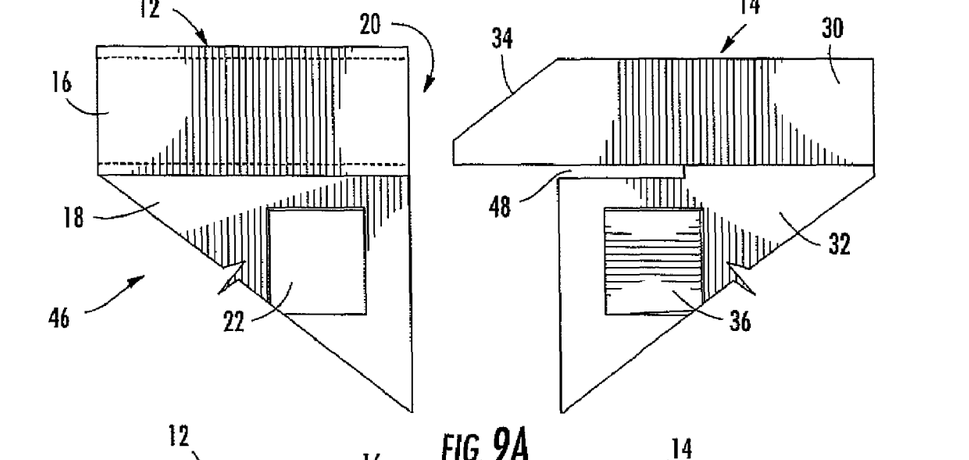
FIGS. 9A-9C are side views illustrating the mating of the first and second mating landscaping edging segments.
Figure 9B:
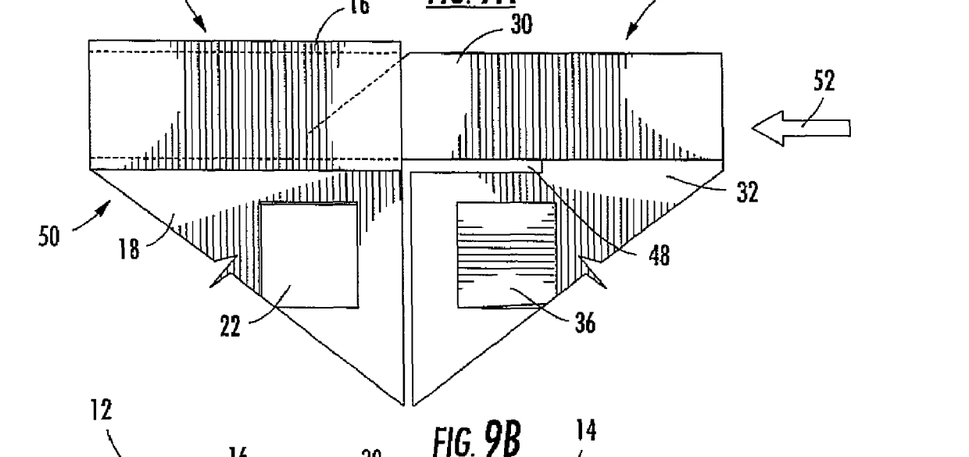
Figure 9C:
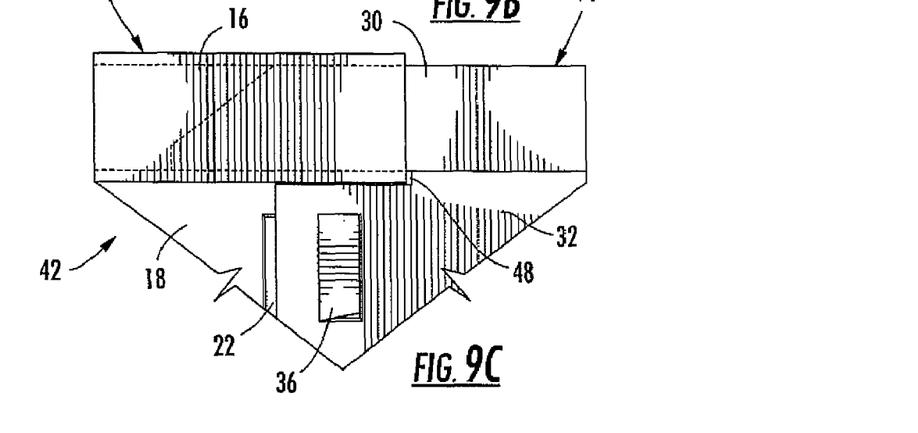

Referring now to FIGS. 9A-9C, the manner in which the segments 12 and 14 are mated is demonstrated. FIG. 9A shows the segments 12 and 14 in the unmated configuration 46, FIG. 9B shows the segments 12 and 14 in a partially mated configuration 50, and FIG. 9C shows the segments 12 and 14 in the mated configuration 42. As shown in FIG. 9A, segments 12 and 14 are aligned such that the receiver 20 of the upper conduit portion 16 is aligned for receiving the end 34 of the upper conduit portion 30 so that the slot 48 will receive the bottom side of the upper conduit portion 16 when mated. Furthermore, the latches 36 are aligned with the corresponding receiver apertures 22 so that the apertures 22 will receive the latches 36 when mated.

Referring now to FIG. 9B, the partially mated configuration 50, the segment 14 is moved in the direction of arrow 52 toward the segment 12. In this step, the receiver 20 of the upper conduit portion 16 is receiving the end 34 of the upper conduit portion 30, and the slot 48 is about to receive the bottom side of the upper conduit portion 16. Referring now to FIG. 9C demonstrating the mated configuration 42, the segment 14 has been fully received by the segment 12. Specifically, the end 34 of the upper conduit portion 14 has been fully received by the receiver 20 of the upper conduit portion 16.

The bottom side of the upper conduit portion 16 has been fully received by the slot 48. Furthermore, the latch 36 has been fully received by the receiver 22. In order to mate the segments 12 and 14, it should be noted that the segment 14 may be moved and thereby mated with the segment 12 as shown in FIGS. 9A-9C. However, in addition, the segment 12 may be moved and thereby mated with the segment 14 or the both the segments 12 and 14 may be moved simultaneously and thereby mated with one-another.

Figure 10:
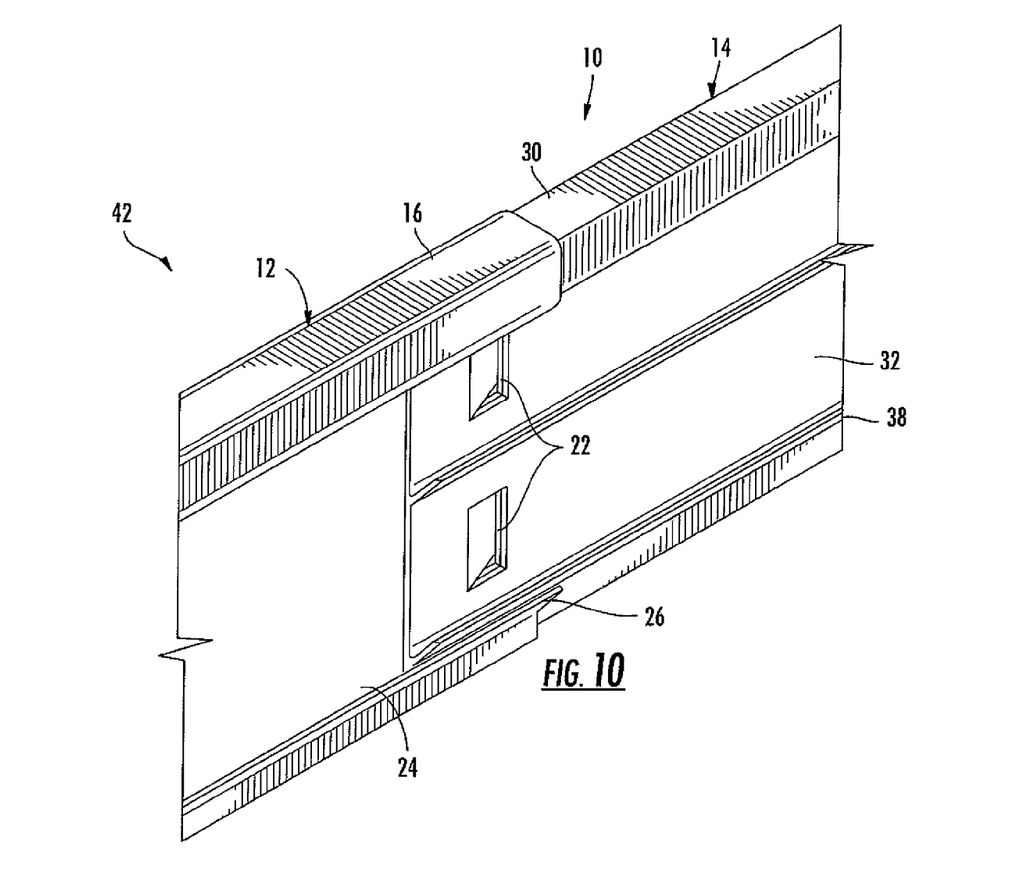
FIG. 10 is a close-up view of the first and second mating landscaping edging segments in the mated configuration.

FIG. 10 illustrates a close-up view of the segments 12 and 14 in the mated configuration 42. As shown, the upper conduit portion 16 has fully received the upper conduit portion 30. The trough 24 and the barb 26 of the segment 12 have received the corresponding lower end of the planar portion 32 and the barb 38 of the segment 14. Also, the receivers 22 of the segment 12 have fully received the latches 36 of the segment 14, thereby securing the landscaping system 10 into the mated configuration 42.

Figure 11:
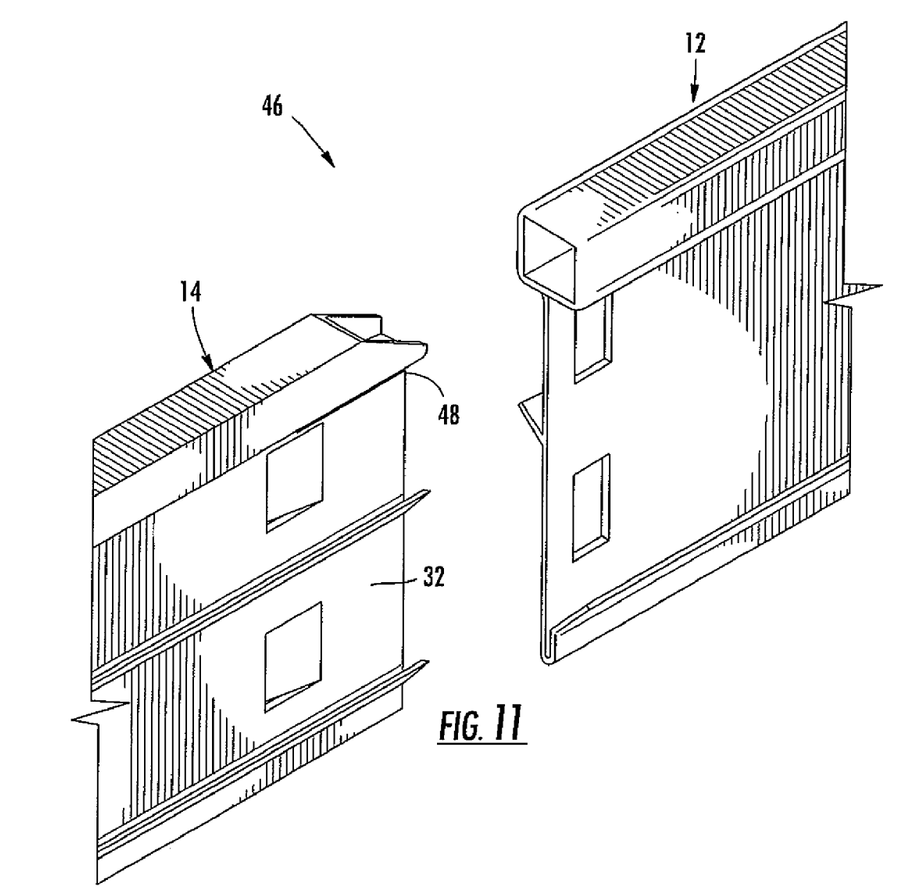
FIGS. 11 and 12 show an additional second edging segment installed on the opposite end of the first edging segment.
Figure 12:
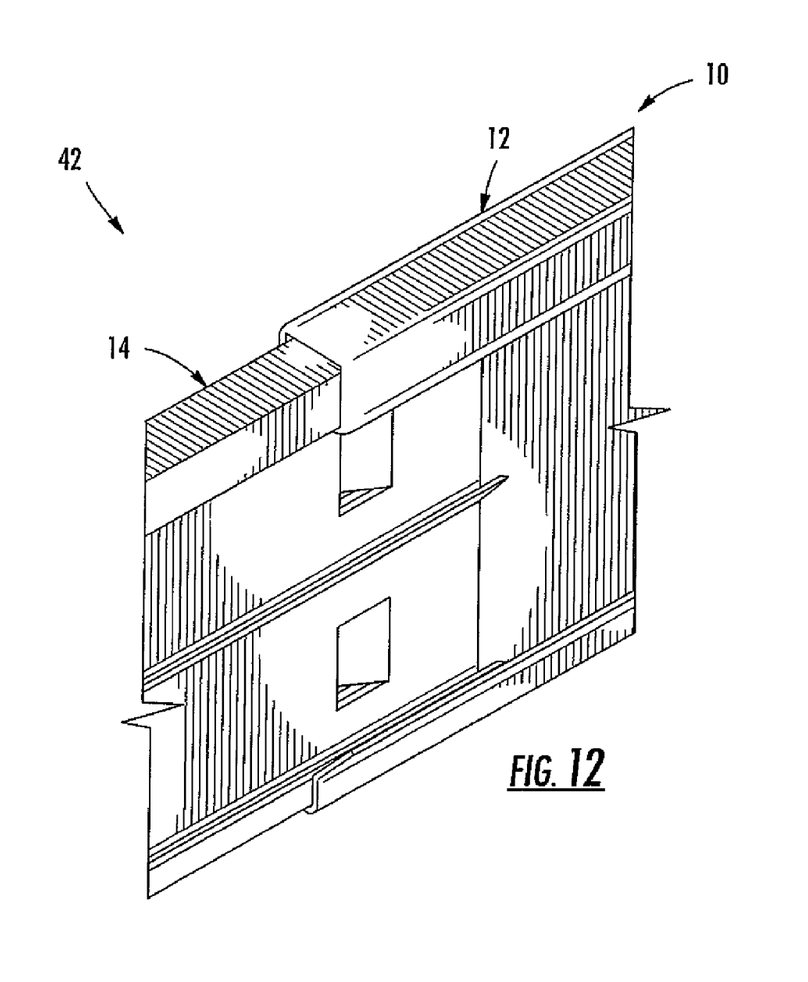

As described above, FIGS. 8-10 show mating of the segments 12 and 14 at one of the ends of the segment 12. It will be understood that the segments 12 and 14 may mate at either end of the segment 12 (or either end of the segment 14), such that the segments 12 and 14 may be alternatingly installed to provide a continuous landscaping structure of a desired length. In this regard, FIGS. 11 and 12 show installation of another one of the segments 14 at the opposite end of the segment 12, it being understood that one of the segments 12 may be installed at either end of one off the segments 14. It will also be understood that the segments 12 and 14 may be provided in virtually any, and not necessarily equal, length and either or both of the segments 12 and 14 may be trimmed or cut to provide a landscaping structure of a desired dimension.

Figure 14:
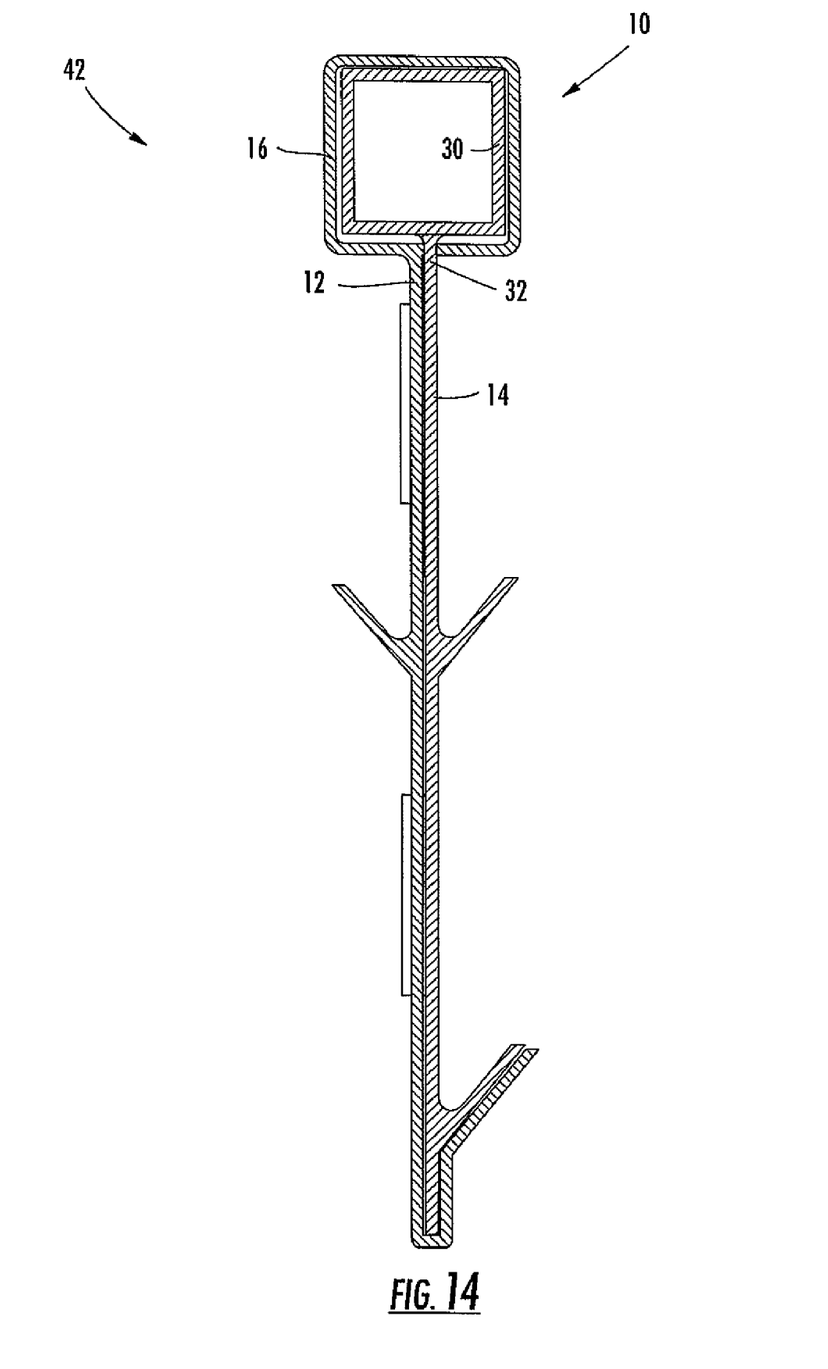
FIG. 14 is a cross-sectional end view of the alternate embodiment of the landscaping system of FIG. 13 in a mated configuration.

Referring now to FIG. 13 an alternate embodiment of a landscaping system 10' is shown. In this embodiment, the slot 48 described previously is not provided, but an open-ended slot 48' is formed into the bottom side of the upper conduit portion 16 of the segment 12 for receiving a portion of the planar portion 32 of the segment 14. Referring now to FIG. 14, a cross-sectional end view of the system 10' is shown in a mated configuration 42, with the planar portion 32 of the segment 14 shown overlapping the bottom side of the upper conduit portion 16 of the segment 12.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A landscape system for installation within the ground, comprising:
    a first edging segment having a first conduit portion having a first open end defining a receiver, and a first planar portion configured for being anchored within the ground and extending from the first conduit portion with an upper edge of the first planar portion extending downwardly from a longitudinal lower edge of the first conduit portion; and
    a second edging segment configured for mating with the first edging segment and having a second conduit portion having a received end configured to be smaller in cross section than the receiver for being received by the receiver of the first edging segment without flexing or expanding the receiver, and a second planar portion configured for being anchored within the ground and extending from the second conduit portion with an upper edge of the first planar portion extending downwardly from a longitudinal lower edge of the second conduit portion; and
    a slot having an open end and a closed end disposed either adjacent the first open end of the first edging segment or adjacent the first received end of the second edging segment, the slot being configured for receiving a portion of one of the first or second edging segments so that the first and second edging segments may be mated by the first open end of the first edging segment receiving the first received end of the second edging segment, with the first and second edging segments partially overlapping with one edging sliding through the open end and toward the closed end of the slot.

2. The edging system of claim 1, wherein the planar portion of one of the edging segments defines at least one receiver aperture, and the planar portion of the other edging segment has at least one latch, wherein the receiver apertures and the latches are each correspondingly located on the planar portions and configured for being matingly engaged when the first and second edging segments are mated and partially overlapping, to maintain the segments in the mated and overlapped relationship.

3. The edging system of claim 1 further comprising a thin linear edge formed on the end of one of the first and second edging segments and a lower receiver formed on the lower edge of the other of the first and second edging segments, the lower receiver configured to receive and hold the thin linear edge when the first and second segments are overlapped.

4. The edging system of claim 1 further comprising a thin linear edge with an adjacent lower barb formed on the end of one of the first and second edging segments and a lower receiver formed on the lower edge of the other of the first and second edging segments, the lower receiver configured to receive and hold the thin linear edge when the first and second segments are overlapped.

5. The edging system of claim 1 further comprising a first midsection barb formed along a longitudinal midsection section of the first edging segment and a second midsection barb formed along a longitudinal midsection of the second edging segment, the first and second midsection barbs being disposed to extend away from respective edging segments in opposite directions.

6. A landscape system for installation within the ground, comprising:
    a first edging segment having a first conduit portion having a first open end defining a receiver, and a first planar portion configured for being anchored within the ground and extending from the first conduit portion with an upper edge of the first planar portion extending downwardly from a longitudinal lower edge of the first conduit portion;
    a second edging segment configured for mating with the first edging segment and having a second conduit portion having a received end configured to be smaller in cross section than the receiver for being received by the receiver of the first edging segment without flexing or expanding the receiver, and a second planar portion configured for being anchored within the ground and extending from the second conduit portion with an upper edge of the first planar portion extending downwardly from a longitudinal lower edge of the second conduit portion;

a slot having an open end and a closed end disposed either adjacent the first open end of the first edging segment or adjacent the received end of the second edging segment, the slot being configured for receiving a portion of one of the first or second edging segments so that the first and second edging segments may be mated by the first open end of the first edging segment receiving the received end of the second edging segment, with the first and second edging segments partially overlapping with one edging segment sliding through the open end and toward the closed end of the slot;

wherein the planar portion of one of the edging segments defines at least one receiver aperture, and the planar portion of the other edging segment has at least one latch, wherein the receiver apertures and the latches are each correspondingly located on the planar portions and configured for being matingly engaged when the first and second edging segments are mated and partially overlapping, to maintain the segments in the mated and overlapped relationship;

a thin linear edge and adjacent barb formed on the lower edge of one of the first and second edging segments;

a barbed lower receiver formed on the lower edge of the other of the first and second edging segments, the lower receiver configured to receive and hold the thin linear edge when the first and second segments are overlapped;

a first midsection barb formed along a longitudinal midsection section of the first edging segment; and a second midsection barb formed along a longitudinal midsection of the second edging segment, the first and second midsection barbs being disposed to extend away from respective edging segments in opposite directions.

* * * * *